United States Patent Office 3,769,315
Patented Oct. 30, 1973

3,769,315
PREPARATION OF 3,3'-POLYTHIODIPROPIONIC ACIDS AND THEIR DERIVATIVES
Ronald L. Keener, Camden, N.J., and Harry R. Raterink, Drexel Hill, Pa., assignors to Rohm and Haas Company, Philadelphia, Pa.
No Drawing. Filed Nov. 19, 1969, Ser. No. 878,176
Int. Cl. C07c 149/20
U.S. Cl. 260—465.8                                     8 Claims

ABSTRACT OF THE DISCLOSURE 3,3'-polythiodipropionic acids and their derivatives can be prepared by reacting an acrylic or methacrylic acid or derivative with sulfur, hydrogen sulfide, and an ammonium, alkali metal, or alkaline earth metal sulfide or polysulfide.

---

This invention relates to the preparation of certain 3,3'-polythiodipropionic acids and their derivatives.

Several methods have been used in the past to convert various $\alpha,\beta$-ethylenically unsaturated acids and their derivatives to the corresponding $\beta,\beta'$-dithiodiacids or derivatives. For example, in Murphy et al. U.S. Pat. 2,623,066, granted on Dec. 23, 1952, the reaction of $\alpha,\beta$-ethylenically unsaturated acids and esters with a source of polysulfide ions to form $\beta,\beta'$-dithiodicarboxylic acids is disclosed. However, a disadvantage of this reaction is that $\alpha,\beta$-ethylenically unsaturated *esters* are hydrolyzed to the corresponding $\beta,\beta'$-dithiodicarboxylic *acids* under the reaction conditions. In German Pat. 894,244, published on Oct. 22, 1953, a reaction similar to that of Murphy et al. is disclosed in which derivatives of acrylic acid, such as acrylonitrile and butyl acrylate, are reacted with a polysulfide, such as sodium polysulfide, to give the corresponding $\beta,\beta'$-dithiodiacrylic acid derivatives. However, this reaction gives very poor yields of the dithio derivatives. Furthermore, the reaction processes disclosed in both the Murphy et al. patent and the German patent require at least one mole of polysulfide to produce one mole of product. The present invention provides a novel process for preparing 3,3'-polythiodipropionic acids and their derivatives in high yield, with high purity, and with high reaction productivity, while employing reaction conditions mild enough to prevent hydrolysis of propionic acid derivatives.

According to the invention, a 3,3'-polythiodipropionic acid or acid derivative of the formula

$$Y-\overset{Y}{\underset{|}{C}}H-CH_2-S_n-CH_2\overset{Y}{\underset{|}{C}}H-X \qquad (I)$$

wherein:

X is a carboxy group (—COOH), a cyano group (—CN), a carbamoyl group (—CONH$_2$), a substituted carbamoyl group of the formula —CONHR or

—CONRR' wherein RR' are alkyl groups of 1 to 3 carbon atoms, or a carbalkoxy group of the formula —COOR", wherein R" is an alkyl group of 1 to 4 carbon atoms,
Y is hydrogen or a methyl group, and
$n$ is an integer of from 2 to 4, can be prepared in good yield by contacting a compound of the formula

$$CH_2=\overset{Y}{\underset{|}{C}}-X \qquad (II)$$

wherein X and Y are as defined above, with sulfur, hydrogen sulfide, and an ammonium, alkali metal, or alkaline earth metal sulfide or polysulfide.

The process of the invention yields tri- and tetrathio compounds, that is, $n$ in Formula I is 3 or 4, as well as dithio compounds. While the tri- and tetrathio compounds are themselves useful materials, they are generally not isolated from the reaction mixture. To convert the tri- and tetrathio compounds to their dithio analogues, in order to isolate a dithio reaction product in high purity, the reaction mixture is treated with an inorganic cyanide or sulfite. The treatment with cyanide or sulfite can be carried out in any convenient manner. For example, the cyanide or sulfite can be added directly to the reaction mixture, or the crude reaction product, either alone or in an organic solvent, can be treated with an aqueous solution of the cyanide or sulfite.

A wide variety of $\alpha,\beta$-ethylenically unsaturated acids and their derivatives can be reacted according to the process of the invention. Examples of such acids and derivatives include acrylic acid, methyl acrylate, ethyl acrylate, n-butyl acrylate, acrylamide, N-methylacrylamide, N,N-diethylacrylamide, acrylonitrile, methyl methacrylamide, and the like.

Among the sulfides and polysulfides which are useful in the process of the invention are ammonium sulfide, ammonium polysulfides, alkali metal sulfides, and polysulfides such as sodium sulfide and potassium sulfide, and their polysulfides, and alkaline earth metal sulfides and polysulfides, such as magnesium sulfide, calcium sulfide, and barium sulfide and their polysulfides. Any inorganic sulfide which will serve as a source of polysulfide ions under the reaction conditions without significantly interfering with the production of polythiodipropionic acid or derivative can be used. Although the precise nature of the reaction mechanism is not known, it is believed that the sulfide ions interact with the elemental sulfur to form polysulfide ions in situ and that these polysulfide ions are involved in the actual reaction with the acid or acid derivative. The sulfide is generally added to the reaction mixture in the form of an aqueous solution.

The hydrogen sulfide can be added directly to the reaction mixture. Alternatively, it can be generated in situ, for example, by adding an equivalent amount of sodium sulfhydrate (NaSH) to the reaction mixture, followed by the introduction of hydrogen chloride gas simultaneously with the acrylate or methacrylate derivative. Other well-known techniques for generating hydrogen sulfide in situ can also be used.

The process of the invention can be carried out over a broad temperature range, and the temperature at which the reaction is run will depend in part on the acid or acid derivative used as a starting material. An advantage of the process of the present invention is that reaction often proceeds smoothly and with high yields even at temperatures well below room temperature, thus helping to minimize any hydrolysis of acid derivatives. Generally, the reaction will be run at a temperature of about —15° C. to +60° C. The preferred temperature range when acrylic acid or a derivative is used as the starting material is about 0° C. to 15° C., while the preferred temperature range when methacrylic acid or a derivative is used as the starting material is about 25° C. to 50° C. Although the process is generally carried out at atmospheric pressure, it may be advantageous to employ higher or lower pressures under some reaction conditions.

The stoichiometric molar ratio of acrylic acid or derivative:hydrogen sulfide:sulfur required for formation of the disulfide is 2:1:1. Under some reaction conditions, it may be advantageous to use an excess of hydrogen sulfide or of sulfur. The hydrogen sulfide will react with the base formed by the reaction, thereby regenerating the inorganic sulfide. This allows the molar ratio of inorganic sulfide to acrylic acid or derivative to be reduced as low as about 0.1 to 1. Of course, a higher ratio of inorganic sulfide can be used, if desired. Since considerably less inorganic sulfide is required than in prior art processes, the reaction productivity of the process of the present invention is much greater than in the known processes. Moreover, the addition of hydrogen sulfide to the reaction medium also maintains the pH at such a level that hydrolysis of the acid derivatives, and particularly of acrylic or methacrylic esters, is minimized.

In carrying out the process of the invention, an organic solvent, inert to the reaction, can be used as a diluent for the acid or acid derivative. However, when the acid or acid derivative is itself a liquid, it may be advantageous to run the reaction without any additional solvent. When no organic solvent is used, the productivity of the reaction can be greatly increased. Among the suitable solvents which can be employed are benzene, toluene, hexane, ethylene dichloride, ethyl chloride, nitrobenzene, aliphatic hydrocarbons and mixtures thereof, chloroform, ethyl acetate, and the like. In a preferred embodiment of the invention, when an acid derivative is a starting material, a two-phase reaction system is used. One phase, an organic phase, will comprise the acid derivative and an organic solvent, if one is used, while the other phase, an aqueous phase, will comprise a sulfide and sulfur as well as hydrogen sulfide. An advantage of this two-phase system is that the inorganic sulfide, and consequently the polysulfide, which is regenerated during the course of the reaction, will remain in the aqueous polysulfide phase, which can be used directly in further reaction, thus reducing the total amount of sulfide needed and, hence, the cost of the process.

The dithio compounds prepared by the process of the invention are known compounds which have wide utility. For example, such compounds have been used as plasticizers, softening agents, rubber additives and as intermediates in the preparation of pharmaceutical and agricultural chemicals. They are particularly useful in the preparation of 3-hydroxyisothiazoles and 3-isothiazolones by reaction with a halogenating agent, such as chlorine, bromine, sulfuryl chloride, sulfuryl bromide, or the like.

The following examples will further illustrate this invention but are not intended to limit it in any way. All temperatures are in degrees centigrade unless otherwise stated.

EXAMPLE 1

Preparation of dimethyl 3,3'-dithiodipropionate

To a stirred and cooled reaction mixture containing 38.7 g. (0.25 mole) of 44% ammonium sulfide, 77.5 g. of water, 56 g. of sulfur (1.75 moles) and 248 g. of ethylene dichloride were added simultaneously over a two hour period 172 g. (2 moles) of methyl acrylate and 34 g. (1.0 mole) of anhydrous hydrogen sulfide. The temperature was maintained at about 0–10° during the addition period by external cooling. The ethylene dichloride phase was separated from the aqueous phase and washed for three hours at 15° with 1000 g. of molar sodium cyanide solution. The organic phase was again separated and washed twice with 1000 ml. of water. Stripping of the organic phase afforded 234 g. of product which analyzed as 95% dimethyl 3,3'-dithiopropionate by gas-liquid chromatography.

EXAMPLE 2

Preparation of dimethyl 3,3'-dithiodipropionate

To a stirred mixture containing 21.6 g. (0.3 mole) of calcium sulfide, 77 g. (2.4 moles) of sulfur, 500 cc. of water and 300 g. of toluene were added simultaneously over one hour, 40.8 g. (1.2 moles) of hydrogen sulfide and 206.4 g. (2.4 moles) of methyl acrylate. The temperature was maintained at 22–25° during and for 15 minutes after the additions.

The upper organic phase was separated and one-half of it stirred for three hours at 50° C. with 600 ml. of 1 molar sodium sulfite. The toluene layer was subsequently washed with 300 ml. of water and stripped in vacuo to afford 106 g. of a colorless oil which contained 80% of the dimethyl dithiodipropionate ester.

EXAMPLE 3

Preparation of 3,3'-dithiodipropionitrile

To a stirred and cooled reaction mixture containing 68.8 g. (1.0 mole) of ammonium sulfide, 164.8 g. of water, 160 g. of sulfur and 400 g. of ethylene dichloride was added simultaneously over a two hour period 212 g. (4.0 moles) of acrylonitrile in 400 gm. of ethylene dichloride and 68 g. of anhydrous hydrogen sulfide. The mixture was stirred for 15 minutes after the additions and the organic phase then separated. The organic phase was diluted with 160 g. of ethylene dichloride and one fourth of this solution was stirred with 563 g. of 1 molar sodium sulfite for 30 minutes. Gas-liquid chromatography analysis of the organic phase after washing indicated the solution to be 26.2% 3,3'-dithiodipropionitrile (94.4% yield).

EXAMPLE 4

Preparation of 3,3'-dithiodipropionamide

To a stirred reaction mixture containing 20 ml. of 44% ammonium sulfide (0.125 mole), 123 cc. of water and 28 g. of sulfur (0.875 mole) were added simultaneously over 30 minutes 71 g. (1.0 mole) of acrylamide in 234 g. of water and 17 g. (0.5 mole) of hydrogen sulfide. The temperature was maintained below 17° during the addition by means of external cooling. The reaction mixture was stirred an additional 15 minutes and filtered. The wet solids were stirred with 300 ml. of molar sodium cyanide at 0° for 15 minutes and again filtered. After washing further with water, there was obtained 75 g. (72%) of 3,3'-dithiodipropionamide, M.P. 166–173°. Microanalyses gave the following results: C, 34.2%; H, 5.72%; S, 31.4%. Theroretical values are: C, 34.6%, H, 5.76%; S, 30.8%.

EXAMPLE 5

Preparation of 3,3'-dithiodipropionamide

To a stirred and cooled reaction mixture containing 218 g. (0.5 mole) of 40% aqueous sodium tetrasulfide and 16 g. (0.5 mole) of sulfur were added simultaneously over a one-hour period, 32.7 g. (0.96 mole) of hydrogen sulfide and 71 g. (1.0 mole) of acrylamide in 234 g. of water. The temperature was maintained at 14–17° during and for 15 minutes after the additions were complete.

The slurry was filtered on a Büchner funnel and the solids were washed once with 300 ml. of 4 molar sodium cyanide and once with 300 ml. of water. After drying, the white solid 3,3'-dithiodipropionamide weighed 57 g. (55% yield) and melted at 176–180°. The product analyzed as follows: C, 34.87; H, 5.93; O, 15.48; S, 30.58.

EXAMPLE 6

Preparation of 3,3'-dithiodipropionamide

To a stirred and cooled reaction mixture containing 218 g. (0.5 mole) of 40% aqueous sodium tetrasulfide, 16 g. (0.5 mole) of sulfur, 50 g. of water and 77 g. (1.0 mole) of sodium sulfhydrate (containing 27% water) were added simultaneously over a one hour period, 36.5 g. (1.0 mole) of anhydrous hydrogen chloride and 71 g. (1.0 mole) of acrylamide in 234 g. of water.

The reaction mixture was diluted with 100 ml. of water and filtered. The solid material was washed successively with dilute sodium cyanide solution and with water to afford, after drying 68 g. (65% yield) of white solid 3,3'-dithiodipropionamide, M.P. 169–176°. The product analyzed as follows: C, 34.46; H, 5.91; O, 15.50; S, 30.70.

EXAMPLE 7

Preparation of dimethyl 2,2'-dimethyl-3,3'-dithiodipropionate

To a stirred reaction mixture containing 20.4 g. (0.3 mole) of ammonium sulfide, 119 g. of water, 57.6 g. (1.8 moles) of sulfur and 298 g. of toluene were added simultaneously over one hour, 40.8 g. (1.2 moles) of hydrogen sulfide and 240 g. (2.4 moles) of methyl methacrylate. The temperature was maintained at 35° during and for 15 minutes after the additions.

One-half of the upper organic layer was stirred at 50° for three hours with 600 ml. of 1 molar sodium sulfite solution. The toluene layer was subsequently washed with 300 ml. of water and stripped in vacuo to afford 80.0 g. of a colorless oil. Elemental and mass spectral analyses of this oil indicated the product to be mainly dimethyl 2,2'-dimethyl-3,3'-dithiodipropionate.

EXAMPLE 8

Preparation of dimethyl 3,3'-dithiodipropionate

This example shows the preparation of one of the 3,3'-dithiopropionic acid derivatives without using a solvent.

To a stirred and cooled reaction mixture containing 46.4 g. (0.3 mole) of 44% aqueous ammonium sulfide, 93 g. of water and 57.6 g. (1.8 moles) of sulfur were added simultaneously over a one-hour period 206.4 g. (2.4 moles) of methyl acrylate and 40.8 g. (1.2 moles) of anhydrous hydrogen sulfide. The temperature was maintained at 0–5° C. during the addition period by means of external cooling.

The lower product layer was then separated from the upper aqueous phase and heated with stirring for three hours at 50° C. with 1200 cc. of 1 M sodium sulfite solution. The product layer was again separated from the aqueous phase and rewashed with 600 cc. of water. The product layer was finally stripped in vacuo on a rotary film evaporator to afford 253 g. (89%) of a colorless oil analyzing as 99% dimethyl 3,3'-dithiodipropionate by gas-liquid chromatography.

It is to be understood that changes and variations may be made without departing from the spirit and scope of the invention as defined by the appended claims.

We claim:
1. A process for preparing a mixture of compounds of the formula

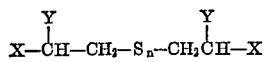

wherein:
X is a carboxy group, a cyano group, a carbamoyl group of the formula —CONRR', wherein R and R' are hydrogen or alkyl groups of 1 to 3 carbon atoms, or a carbalkoxy group of the formula —COOR", wherein R" is an alkyl group of 1 to 4 carbon atoms,
Y is hydrogn or a methyl group, and
$n$ is an integer of from 2 to 4,
which comprises contacting an unsaturated compound of the formula

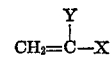

wherein X and Y are as defined above, with at least about ½ mole elemental sulfur per mole of the unsaturated compound, at least about ½ mole hydrogen sulfide per mole of the unsaturated compound, and a sulfide selected from the group consisting of alkali metal sulfides and polysulfides, alkaline earth metal sulfides and polysulfides, ammonium sulfide and ammonium polysulfides.

2. The process of claim 1 which is carried out at a temperature of —15° C. to +60° C.

3. The process of claim 1 wherein the sulfide is ammonium sulfide or an ammonium polysulfide.

4. The process of claim 1 wherein Y is hydrogen.

5. The process of claim 4 wherein X is a carbomethoxy group.

6. The process of claim 4 wherein X is a carbamoyl group of the formula —CONH$_2$.

7. The process of claim 4 wherein Y is a cyano group.

8. The process of claim 1 wherein Y is a methyl group.

References Cited
UNITED STATES PATENTS

| | | | |
|---|---|---|---|
| 3,544,591 | 12/1970 | England | 260—327 |
| 3,444,241 | 5/1969 | Eisfeld | 260—608 |
| 3,437,498 | 4/1969 | Martin | 106—19 |
| 3,213,076 | 10/1965 | Budde | 260—132 |

LORRAINE A. WEINBERGER, Primary Examiner

J. F. TERAPANE, Assistant Examiner

US. Cl. X.R.

260—481 R, 537 S, 561 S